Dec. 8, 1964  TSOY K. MOY ETAL  3,160,062
FLEXIBLE FOAM SUPPORT
Filed March 27, 1963
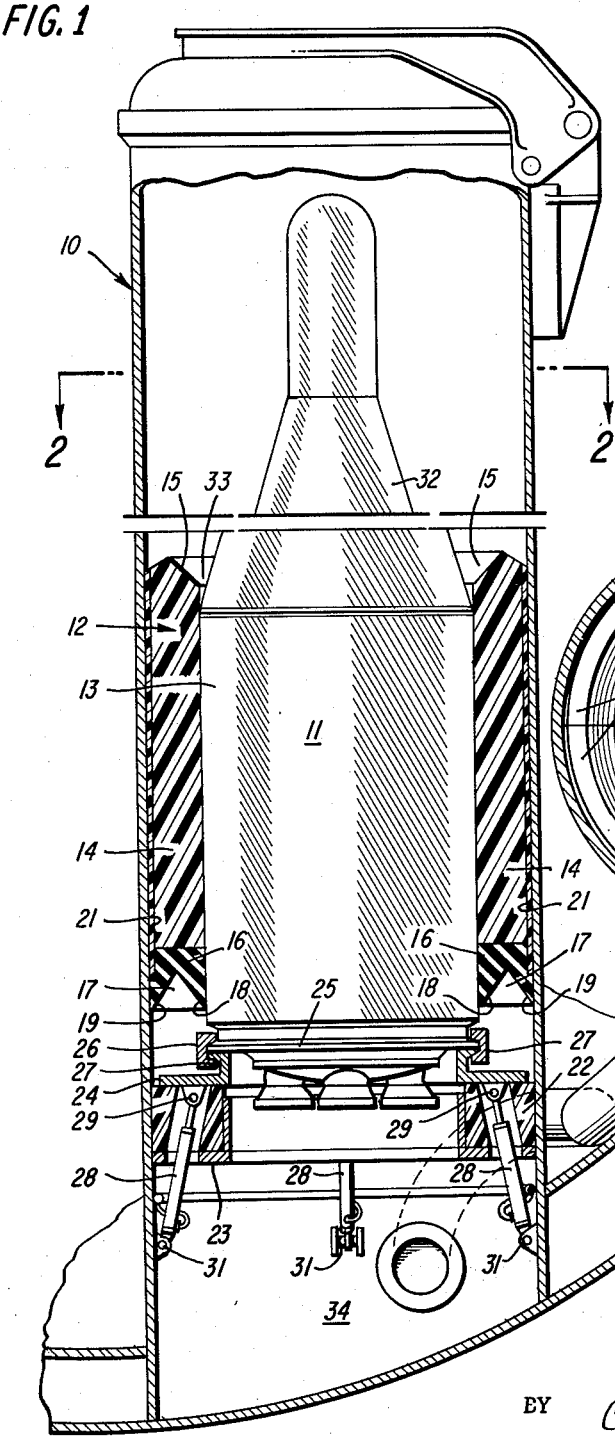
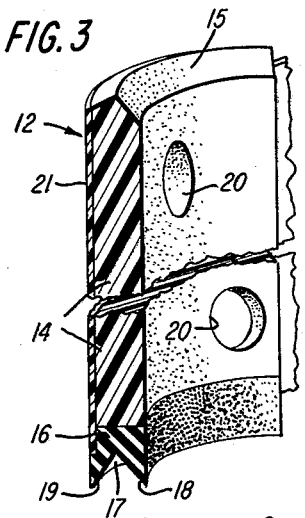
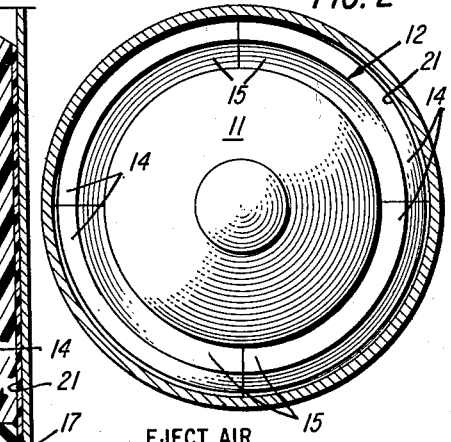
INVENTORS
George F. Mechlin
Tsoy K. Moy
BY Claude Funkhouser
ATTORNEY

United States Patent Office 3,160,062
Patented Dec. 8, 1964

3,160,062
FLEXIBLE FOAM SUPPORT
Tsoy K. Moy, Santa Clara, and George F. Mechlin, Saratoga, Calif., assignors, by mesne assignments, to the United States of America as represented by the Secretary of the Navy
Filed Mar. 27, 1963, Ser. No. 268,507
3 Claims. (Cl. 89—1.7)

The instant invention relates to missile launchers and more particularly to a flexible stowage support or adaptor for isolating a missile from various environmental conditions and for providing a sealing connection between the missile and launching tube during a missile ejecting operation.

With the advent of ballistic missiles came the need for a supporting structure for making the missile launching complex invulnerable to surprise attack by the enemy. Without such invulnerability it would be possible for a ballistic missile capability to be completely destroyed before a missile could be launched in a retaliatory action. Furthermore, without means to protect these launching complexes from destruction by enemy attack, they would be unable to fulfill their primary role as a deterrent to a possible enemy attack. Heretofore, several expedients have been the subject of extensive research and development, the most prominent of which are building concrete silos below ground level, launching the missile from an airborn aircraft, and by launching the missile from a moving ship or land vehicle. While the present invention finds its primary use in missile launchers of land vehicles, it may be employed with missile launchers of the other categories. For example, it is possible that the flexible support or adaptor of the present invention may be utilized in connection with the isolation of any ballistic or guided missile from severe shock and vibration.

The missile launching systems which are utilized on mobile devices such as, for example, land vehicles usually are provided with a supply of missiles stored in a position to permit rapid firing. Such vehicles induce vibrations and irregular shocks during travel at various speeds and thus the missile skin together with the guidance system and other components thereof may be rendered inoperative when subjected to such conditions. It will be understood that the various vibrations developed at the various vehicle speeds becomes a limiting factor in the performance of a vehicle launched missile system. Since these vibrations are primarily generated by vehicle movement, the speed of the vehicle must necessarily be restricted to a speed necessary to prevent vibration damage to the missile and the components thereof. Obviously, the restriction of speed upon the vehicle will greatly enhance its vulnerability. Heretofore, for the purpose of mitigating shock and vibration liquid springs have been employed between the vehicle and a launching tube. Additionally, non-linear ring type springs, normally termed stowage adapters, have been employed in the annular space between the missile and the launching tube. The use of liquid springs, however, causes certain undesirable conditions. For example, such springs are preloaded to such an extent that they normally act as rigid connections. Consequently, vehicle induced vibrations are not attenuated by the liquid springs, but to the contrary, are amplified as a path through the missile launcher's structure to the missile itself. Consequently, for satisfactory operation the missile supports between the launching tube and missile are required to damp these vibrations.

The ring type springs which have been employed in sets of identical springs also, however, have certain disadvantages. It has been found, for example, that under certain conditions, a tolerance-induced axial bow in the missile will produce prohibitive stresses in the missile. That is, the tolerance-induced axial bow causes a non-uniform compression of the springs thereby causing a bending moment in the missile. Such bending moment, plus the moment induced by shock, may act in combination to inordinately stress the missile at its mid-section.

The stowage support or adapter of the instant invention overcomes the aforesaid disadvantages encountered in the aforementioned spring devices by providing a circular flexible foamed plastic support disposed between the missile and the launching tube which extends substantially the full length of the missile and which entirely fills the circular cavity therebetween. The present invention further provides a flexible missile support which is launchable with the missile and, therefore, allows, the elimination of the usual inner launching tube heretofore essential in the launching of such types of missiles. Morevore, the invention further provides a launching system including flexible supporting means which is admirably suited for launching a missile from a mobile unit or carrier.

Accordingly, it is an object of the present invention to provide a stowage adapter or flexible support capable of protecting a missile from severe vibrations and shocks.

Another object of the invention is to provide flexible missile support of a size sufficient to enclose and protect the missile during transportation.

Another object of the invention is to provide a flexible stowage adapter for attenuating vibrations and shock transferred to a missile while stored in a moving vehicle.

Still another object of the invention is to provide a support system which transfers external loads to missiles over large areas during logistic, prelaunch and launch phases.

A still further object of the invention is to provide a support for tube-launched missile which give superior load distribution during transportation and storage.

An additional object of the invention is the provision of a support system that is detachably secured to and launchable with a missile.

Other objects, advantages and novel features of the invention will become apparent from the following detailed description of the invention when considered in conjunction with the accompanying drawings wherein:

FIG. 1 is a longitudinal sectional view of a launching tube illustrating a missile supported therein according to the present invention, the missile supporting means being shown in section, FIG. 2 is a cross sectional view taken substantially on line 2—2 of FIG. 1, and FIG. 3 is a fragmentary view in perspective of the missile support or adapter.

Referring now to the drawing and more particularly to FIG. 1 thereof, the numeral 10 indicates a launching tube having centrally disposed therein a missile 11, the missile being provided with a flexible or resilient adapter or support indicated generally by the reference character 12.

The adapter 12 is of circular configuration and extends substantially the full length of the main body 13 of the missile 11, as best shown in FIG. 1. The adapter 12 comprises a plurality of segments 14, composed of any material having springy characteristics such as, for example, polyurethane. The segments 14 snugly engage the missile body 13, having one end extending slightly beyond the body 13 and are provided with a tapered or cup flare portion 15 which incline upwardly and outwardly from the inner surfaces of the segments 14, as best shown in FIGS. 1 and 3. The other end of the segments 14 are each provided with a base seal 16 composed of any flexible material suitable for the purpose such as, for example, rubber or the like.

The base seals 16 are provided with inverted V-shaped grooves 17, the groove being disposed in such a manner, as to form relatively thin inner and outer sealing portions 18 and 19. It will be noted, FIG. 1 that the portion 18 engages the missile body 13 and the portion 19 engages the launching tube 10. It will be understood that the aforesaid sealing portions 18 and 19 function to maintain a sealing connection between the launching tube 10 and the missile body 13 and are constructed and arranged to be operated by the air blast during a missile launching operation. To facilitate communication with the missile where access thereto is required, the adapter is provided with the desired number of openings 20, two of which are shown on FIG. 3 of the drawing.

The adapter or missile support is further provided with an outer retaining sleeve 21 which encloses and maintains the segments 14 in position about the missile body 13. The sleeve 21 is composed of a material having low friction characteristics such as, for example, fiberglass or the like and is disposed in engagement with the launching tube 10 so as to maintain friction at a minimum during a missile launching operation.

It will be noted, FIG. 1, that an annular support 22 is disposed between a flange 23 and the conventional lockout and alignment ring 24, the support being composed of any material suitable for the purpose such as, for example, polyurethane or the like. If so desired, the support 22 may be foamed into position between flange 23 and ring 24 prior to insertion of the missile in the tube.

The lower end of the missile 11 is provided with an annular flange 25 and a similar flange 26 is provided on the ring 24. The aforesaid flanges 25 and 26 cooperate with a conventional missile holddown ring 27, the arrangement being adapted to lock and maintain the missile in the desired position within the launching tube, it being understood that the holddown ring 27 is actuated to release position during a missile launching operation. To further support the missile at the lower end thereof, a plurality of hydraulic devices 28 are utilized, these devices have one end secured to the ring 24, as at 29 and the other end thereof secured to the launching tube as at 31. The resilient ring 24 and the member 28 will protect the missile against axial shock and vibrations.

In FIG. 2, it will be noted that the sleeve 21 extends around the segments 14, the ends thereof being in butt-joint relationship. These ends may be connected in any conventional manner such as, for example, by cement or other bonding technique. It will be understood that the butt-joint is of sufficient strength to maintain the segments 14 in an assembled condition but of insufficient strength to resist a substantial force, as will be hereinafter more clearly set forth. Furthermore, while the adapter 12 has been described as comprising a plurality of segments it may consist of a continuous annular member having a plurality of weakened portions. In like manner to the annular member, the sleeve may be a continuous annular sleeve having a plurality of weakened portions to facilitate separation of the support or adapter from the missile when it is subjected to a substantial force.

From the foregoing it will be apparent that the missile is supported in a single launching tube by a resilient adapter 12 disposed about the missile body 13 and extending substantially the full length thereof and a flexible annular member 22 and a plurality of devices 28. The aforesaid arrangement affords shock and environmental protection to the missile during handling, transportation, field and shipboard stowage phases. For example, transverse protection is provided by the adapter or support 12, and axial protection is provided by the annular resiliently supported member 24 and hydraulic devices 28.

Again referring to FIG. 1, it will be noted that the body 13 of the missile connects to a tapered nose portion 32, the taper of which is in opposition to the taper 15 on the segments 14. Thus, by this arrangement a relatively large air pocket or cavity 33 is provided at the leading end of the adapter 12.

During a missile firing operation the conventional holddown ring moves out of engagement with flange 25 on the missile and flange 26 on ring 24, whereupon the missile is released. Air from a suitable source of air supply (not shown) is supplied to chamber 34 by way of eject air conduit 35 in an amount to forcibly eject the missile from the tube. As the missile moves through the tube, the air acting on the inner sealing portion 18 maintains a sealing connection therebetween and the missile body 13 and in like manner the air maintains a sealing connection between sealing portion 19 and the tube 10 thereby maintaining the tube in a sealed condition, whereupon the full force of the air blast is directed against the missile and thus the missile is forcibly and quickly ejected from the tube. Upon ejection of the missile from the tube at a relatively high rate of speed, air on any fluid medium enters the cavity or pocket 33 with sufficient force to cause the adapter to be torn apart or split asunder and thus separated from the missile body 13.

From the foregoing it will be understood that the present invention not only provides a system for resiliently supporting a missile in a single tube launching structure but also provides new and improved means for sealing and maintaining a sealing connection between the missile and launching tube during a missile launching operation.

Obviously many modifications and variations of the present invention are possible in the light of the above teachings. It is therefore to be understood that within the scope of the appended claims the invention may be practiced otherwise than as specifically described.

What is claimed is:

1. A system for isolating a missile from externally imposed environmental conditions including shock and vibration during handling and transportation comprising a cylindrical launching tube,
   a missile centrally disposed and maintained in said launching tube,
   said missile having a body portion terminating in a nose portion,
   an annular resilient support disposed to fit about said missile in contact with said tube and extending substantially the full length of the body portion for providing transverse support for the missile against shock and vibrations,
   said annular resilient support including a plurality of substantially elastically deformable segmental elements and a substantially frangible sleeve composed of a material having low friction characteristics disposed about the segmental elements and in freely slidable engagement with said launching tube,
   a resilient ring carried by the tube, movable means on said resilient ring and releasably connected to said missile at the lower end thereof,
   means connected to said movable means and to the tube and cooperating with said resilient ring for providing axial support for the missile against shocks and vibrations, and
   an elastic member carried at one end of said annular resilient member to provide a sealing connecting between the tube and the missile.

2. A system according to claim 1 wherein said elastic member includes a sealing element in sealing engagement with the launching tube and an additional sealing element in sealing engagement with the missile for preventing the escape of propelling gases about said missile during launching.

3. A missile supporting and sealing system comprising a projectable body,
   a launching tube,
   an annular resilient support disposed about said body in contact with said launching tube and separable from the body upon projection of the body from the tube, said annular resilient support including a plurality of elastically deformable segmental elements contiguous with said body and a sleeve composed of a hard-surfaced material having low friction characteristics enclosing the segmental elements and in sliding contact with the launching tube, sealing means on one end of the annular resilient support in sealing engagement with the body and the tube as the body is moved through said tube, said sealing means including an annular elastic member having an inverted V-shaped groove forming relatively thin sealing elements maintained in sealing engagement with the body and tube by high pressure air acting thereon until the body is projected from the tube, a flared portion on the other end of the annular resilient support, a complementary flared portion on the body and co-operating with said flared portion on the support to form an air pocket at the leading end of the support for causing the annular resilient support to be forcibly removed from the body as the body is projected from the tube, means for releasably locking the body to the tube until the body is forcibly projected from the tube, and means for establishing an external pressure connection to the tube to forcibly project the body therefrom.

References Cited by the Examiner
UNITED STATES PATENTS

| | | | |
|---|---|---|---|
| 160,569 | 3/75 | Butler | 102—94 |
| 2,989,899 | 6/61 | Siegel et al. | 89—1.7 |
| 3,055,408 | 10/61 | Prosen et al. | 102—93 |
| 3,023,704 | 3/62 | Dawson et al. | 102—94 |
| 3,072,022 | 1/63 | Wood et al. | 89—1.7 |
| 3,089,388 | 5/63 | Webster et al. | 89—1.7 |

BENJAMIN A. BORCHELT, *Primary Examiner.*